United States Patent
Liu

(10) Patent No.: US 9,877,198 B1
(45) Date of Patent: Jan. 23, 2018

(54) NETWORK ACCESS BACKOFF MECHANISM

(71) Applicant: Alcatel-Lucent USA Inc., Murray Hill, NJ (US)

(72) Inventor: Jennifer J-N Liu, Plano, TX (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/295,776

(22) Filed: Oct. 17, 2016

Related U.S. Application Data

(60) Provisional application No. 62/384,844, filed on Sep. 8, 2016.

(51) Int. Cl.

| H04W 12/08 | (2009.01) |
|---|---|
| H04W 12/06 | (2009.01) |
| H04W 48/14 | (2009.01) |
| H04W 88/16 | (2009.01) |
| H04W 88/02 | (2009.01) |

(52) U.S. Cl.
CPC ........... *H04W 12/08* (2013.01); *H04W 12/06* (2013.01); *H04W 48/14* (2013.01); *H04W 88/02* (2013.01); *H04W 88/16* (2013.01)

(58) Field of Classification Search
CPC ..... H04W 12/06; H04W 76/02; H04W 80/04; H04W 80/045; H04W 88/06; H04W 12/00; H04W 12/02; H04W 12/04; H04W 12/08; H04W 36/0022; H04W 36/0033; H04W 80/10; H04W 8/087; H04W 48/08; H04W 84/042; H04W 84/12; H04L 63/061; H04L 63/164; H04L 63/0254; H04L 63/0263
See application file for complete search history.

(56) References Cited

U.S. PATENT DOCUMENTS

| 2008/0104678 A1* | 5/2008 | Hsu ........................ H04L 63/08 726/4 |
| 2015/0207779 A1* | 7/2015 | Hsu ..................... H04L 63/0892 726/4 |
| 2016/0057652 A1* | 2/2016 | Chandramouli .. H04W 28/0289 370/235 |

* cited by examiner

*Primary Examiner* — Diane Mizrahi
(74) *Attorney, Agent, or Firm* — Stephen J. Wyse

(57) ABSTRACT

A manner of managing UE (user equipment) access to a core network via an access network. The access network may be a trusted or un-trusted network according to 3GPP protocols, and the core network may be or include an EPC. When a UE attempts access, a gateway node determines whether the UE will be authorized and responds accordingly. At least when the UE access request is rejected, a response is sent containing a backoff timer value. The backoff timer value may be based on, for example, the cause of the rejection or the number of attempts made by that UE or both. When the UE receives the response, the UE sets a backoff timer accordingly and preferably does not reattempt access until the backoff timer has expired. In some instances, the UE may be permitted to reattempt access immediately; in others, the UE may be directed not to reattempt access at all.

18 Claims, 4 Drawing Sheets

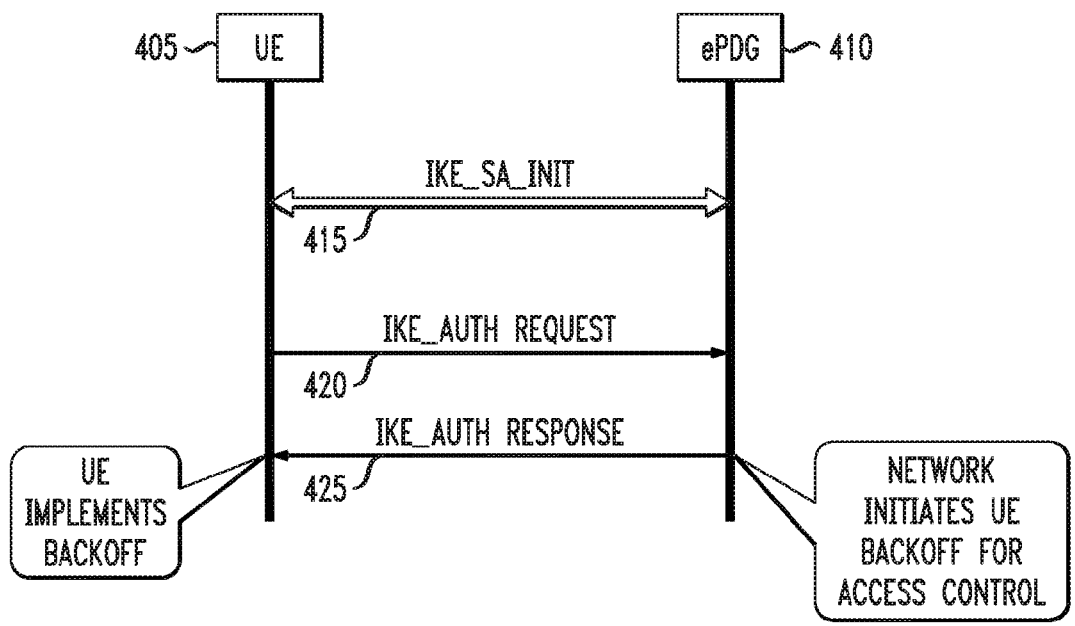

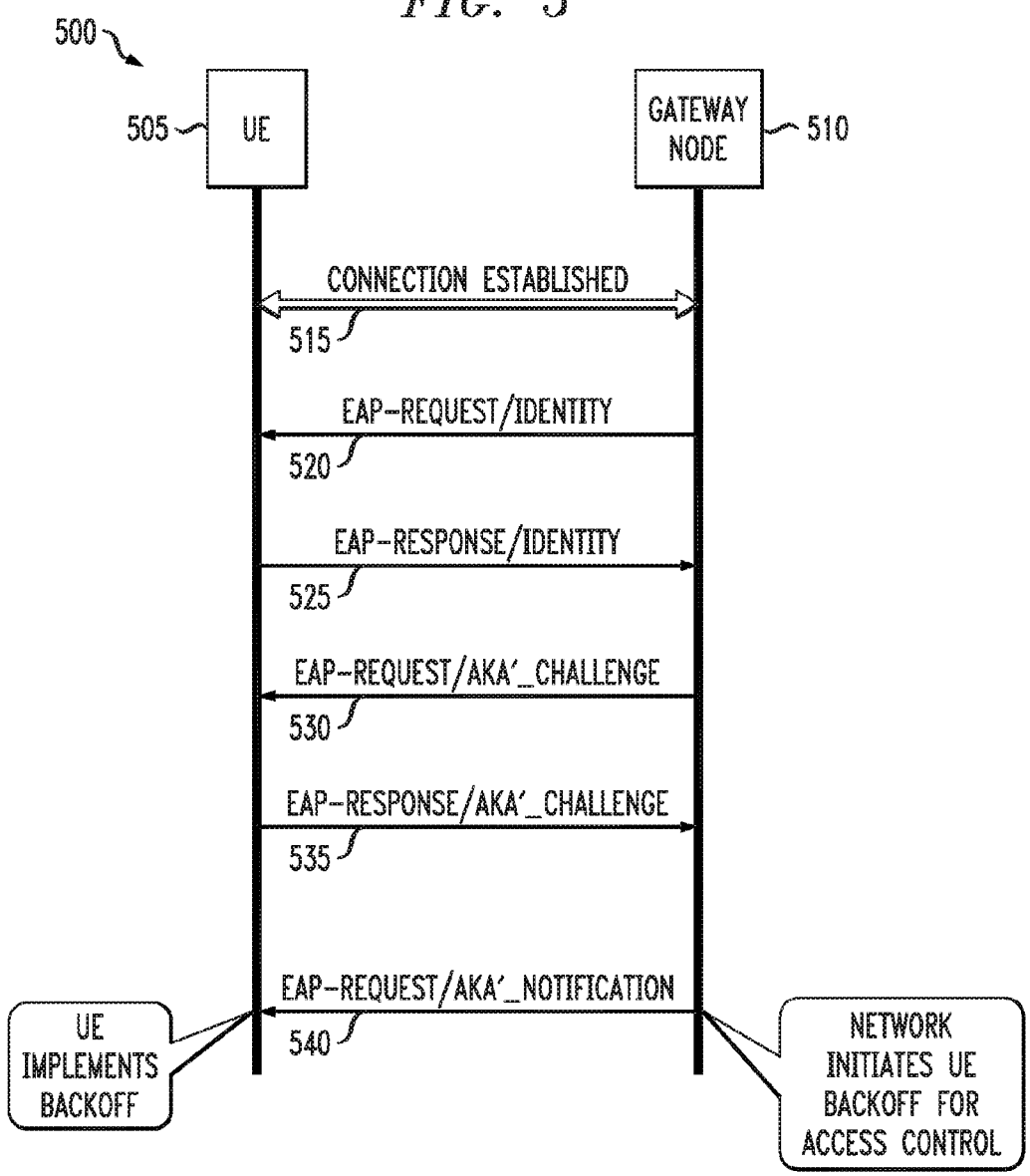

NETWORK ACCESS BACKOFF MECHANISM

CROSS-REFERENCE TO RELATED APPLICATIONS

This non-provisional application claims the benefit of priority under 35 U.S.C. § 119(e) to U.S. Provisional Application No. 62/384,844, filed on 8 Sep. 2016, the entire contents of which are incorporated herein by reference.

BACKGROUND

Field of the Disclosure

The present disclosure relates generally to network communication and, more particularly, to an apparatus and method for managing UE (user equipment) attempts at access to a communication network.

Description of the Related Art

The following abbreviations are herewith expanded, at least some of which are referred to within the following description.
3GPP $3^{rd}$ Generation Partnership Project
AAA Authentication, Authorization, and Accounting
AKA Authentication and Key Agreement
APN Access Point Name
EAP Extensible Authentication Protocol
EDGE Evolved Data Rates for GSM Evolution
EPC Evolved Packet Core
ePDG evolved Packet Data Gateway
GMS Global system for Mobile Communication
GPRS General Packet Radio Service
HPLMN Home PLMN
HSPA High Speed Packet Access
IEEE Institute of Electrical and Electronics Engineers
IETF Internet Engineering Task Force
IKE Internet Key Exchange
ITU International Telecommunication Union
LTE Long-Term Evolution
MCM Multiple-Connection Mode
OAM Operation, Administration and Maintenance
ODIN Open Device Identification Number
PDN Packet Data Network
PGW PDN Gateway
PLMN Public Land Mobile Network
SCM Single-Connection Mode
TWAG Trusted Wireless Access Gateway
TWAN Trusted WLAN Access Network
UE User Equipment
UICC Universal integrated Circuit Card
UMTS United Mobile Telecommunications System
USIM Universal Subscriber Identity Module
WLAN Wireless Local Area Network
WLCP Wireless LAN Control Plane Traditional PLMNs (public land mobile networks), such as cellular networks, include an access portion that allows UE (user equipment) devices to use the network (usually) via a wireless access channel. The access portion is then connected to a core network where high volumes of traffic may be directed to other UEs or networks (for example, another PLNM, a broadcast services provider, or the Internet).

Standard communication protocols are often promulgated to allow equipment made by multiple manufacturers to function together. One organization for the promulgation of such standards is the 3GPP ($3^{rd}$ Generation Partnership Project). 3GPP protocols include multiple technologies for wireless access, for example GPRS, UMTS, EDGE, HSPA, and LTE.

Increasingly, UE are accessing, or attempting to access the core network using access networks that fall outside of the traditional PLMN facilities. A common alternative access network is the LAN (local area network) or WLAN (wireless LAN). Use of such networks is common because many businesses provide the local infrastructure for access. Users are often able to choose whether to establish a communication session with a cellular network base station or a WLAN access point, or both.

Some standard protocols, for example 3GPP, provide for access though these alternate access networks such as WLANs. Different protocols are often used for access through networks that are considered trusted by the core network operator, as opposed to networks that are considered un-trusted.

In some cases, however, a UE attempting to access a core network through WLAN or similar access network may be denied authorization. The denial may be for a variety of reasons and may be temporary, that is, for the present time, or it may be that the UE will not be allowed access at any time. In either case, it is typical for the UE to attempt access again. While this is and of itself is not undesirable, numerous access re-attempts may strain network resources.

Accordingly, there has been and still is a need to address the aforementioned shortcomings and other shortcomings associated with access to core networks via trusted and un-trusted access networks such as WLANs. These needs and other needs are satisfied by the solutions disclosed herein.

SUMMARY OF EMBODIMENTS

Properly managing UE (user equipment) access can make mobile communication networks more efficient, potentially reducing power consumption and reducing or preventing network congestion. Disclosed herein is a backoff mechanism for that is especially advantageous when applied to non-3GPPP access via trusted and un-trusted access networks.

In one aspect, a method of managing access in a wireless communication network includes receiving in a network gateway a request for UE access to a core network, determining whether UE access is authorized, determining a backoff timer value at least if the UE access is not authorized, and generating a response message comprising the determined backoff value, if any. The method may also include sending the response message toward the UE.

In some embodiments, the method may further include sending a query to an authentication server and receiving a response from the authentication server as at least part of determining whether the UE is authorized. The gateway node performing this process may be, for example, an ePDG, a TWAG, or a 3GPP AAA server. The core network may be or may include an EPC.

In some embodiments, the request for UE access is an IKE_AUTH Request message and the response is an IKE_AUTH Response, which may contain a Backoff_Timer Notify payload. If so the Backoff_Timer Notify payload may also include a Protocol ID field and a Notify Message Type field. In other embodiments, the request for UE access may be an EAP-Response/AKA' Challenge including an SCM_REQUEST, and the response may be an EAP-Request/

AKA' Notification including a backoff timer value in an SCM_RESPONSE. The EAP-Request/AKA' Notification may also include a reason for lack of authorization, for example, "general failure after notification", "general failure", "network failure", or "unknown APN". In still other embodiments, the request for UE access may be a WLCP PDN Connectivity Request and the response may be a WLCP PDN Connectivity Reject including a backoff timer value.

In some embodiments, the backoff timer value determination, if any, takes into account a reason for UE authorization failure or a number of attempts (for example, within a certain time period preceding the present request) that the UE has made to gain access, presumably though not necessarily through a particular access point.

In another aspect, a gateway apparatus includes at least one network interface, a processor, a backoff timer message generator, and a non-transitory memory device embodying program instructions that when executed by the processor and the backoff timer message generator cause the gateway apparatus to receive a request for UE access to a core network, determine whether UE access is authorized, determine a backoff timer value if the UE access is not authorized, and generate a response message comprising the determined backoff value, if any.

In some embodiments, the memory device of the gateway apparatus may further include program instructions that executed cause the gateway apparatus to send the response message toward the UE. The program instruction when executed may also cause the gateway apparatus to send a query to an authentication server and to receive a response from the authentication server.

In some embodiments, the gateway apparatus is an ePDG or a TWAG

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 3 illustrates a Backoff_Timer Notify payload according to one embodiment.

FIG. 4 is a message flow diagram illustrating a method for managing access according to one embodiment.

FIG. 5 is a message flow diagram illustrating a method for managing access according to one embodiment.

DETAILED DESCRIPTION

Managing communication-network access may in some implementations provide a manner of improving network efficiency and reducing congestion. Network access may be managed, for example, by authentication procedures that limit who or which devices may utilize the network. Disclosed herein is a manner of managing network access by attempting to control access initiation by UE (user equipment) such as computers, smart phones, tablets, and similar devices. Note that while UE are usually mobile in nature or capability, this is not always the case.

A UE attempting to access a communication network may be denied access for one reason or another. When this occurs, the UE frequently re-attempts access either with or without querying the user to determine if a re-attempt is desirable. At times, however, the re-attempt is likely or even certain to be unsuccessful, perhaps for the reason it was unsuccessful the first time. Numerous access attempts by numerous UE tax network resources and may to some extent lower the capacity of the network.

Figure 1:
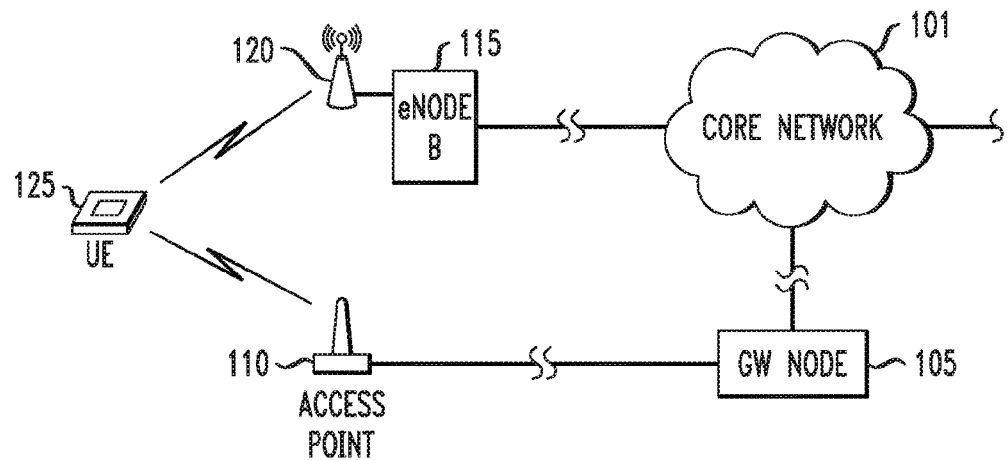
FIG. 1 is a simplified block diagram illustrating selected components of an exemplary network configuration in which the present invention may be advantageously implemented.

FIG. 1 is a simplified block diagram illustrating selected components of an exemplary network configuration in which the present invention may be advantageously implemented. Note that this may also be viewed as the juxtaposition of selected components of various networks. UE 125 may or may not be considered part of a network; it is the device used by a user or subscriber to access services available through the network or networks represented in FIG. 1. UE 125 is typically though not necessarily a mobile device capable of communicating with other devices, fixed or mobile, over a wireless interface.

Base station 115, here an eNodeB, is part of a mobile communication network and communicates over a wireless interface using antenna 120. Although only one base station is shown, there are in a typical network many more, some of them serving multiple antennas. Base station 115 is also in communication with a core network 101. Core network may include an EPC (evolved packet core) network that facilitates access to other devices such as application servers and other networks such as the Internet. Assuming that UE may be properly authenticated, it may access the services or devices accessible via core network 101.

In some environments, US 125 may be a subscriber to a PLMN (public land mobile network) represented here by base station 115 and like components that facilitate access to core network 101. Such networks may be configured according to standard protocols such as 3GPP to allow access for a variety of UE made by different manufacturers. Such devices, however, are often able to communicate with and through non-3GPP networks as well.

In the embodiment of FIG. 1, UE 125 is also able to establish a communication session with wireless access point 110. The user of UE 125 may wish to do this, for example, for economic reasons if data transmissions via access point 110 are less expensive than data transmissions via base station 115. Or the connection to access point 110 at the current location of UE 125 may be stronger or more reliable. In some instances there may be no base station such as base station 115 within range. Access point 110 may be part of a network containing a number of such access devices (not shown) and often referred to as a WLAN (wireless local area network). The WLAN and access point 110 may be able to provide access for UE 125 to the core network 101 and hence to the services and devices otherwise available there.

If, as is often the case, the WLAN and access point 110 are not part of the same network as base station 115, communications with the core network 101 usually have to traverse a gateway node such as gateway 105 shown in FIG. 1. In many implementations, gateway 105 may be an ePDG (evolved packet data gateway). While the 3GPP or other protocols may permit such access, it may be categorized as untrusted, depending on the access network involved. The ePDG facilitates secure communication between the UE and the core network via the untrusted non-3GPP network.

Figure 2:
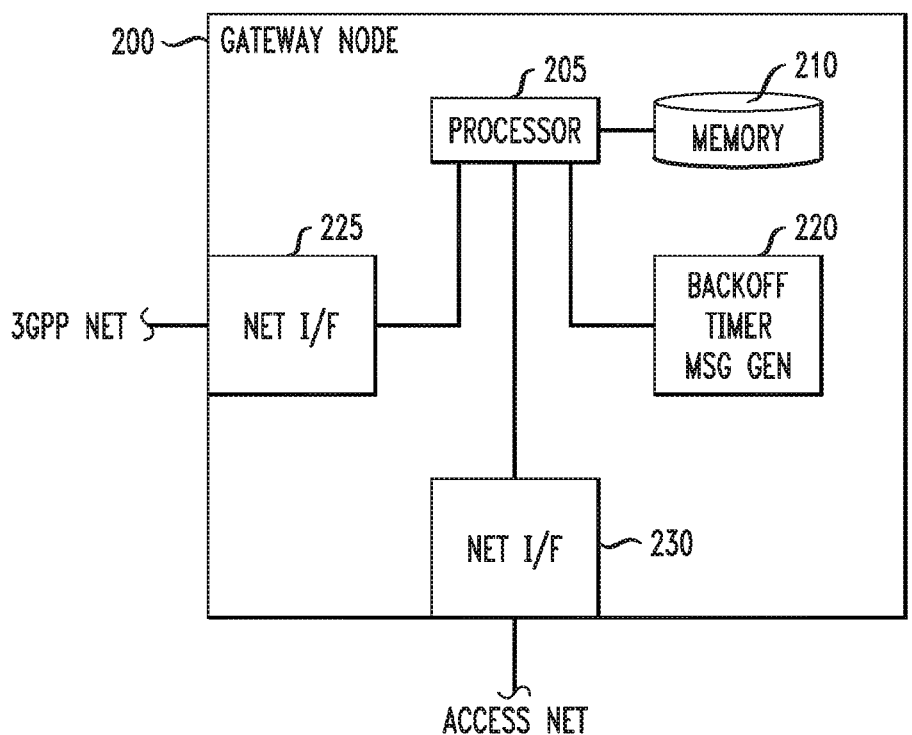
FIG. 2 is a simplified block diagram illustrating selected components of a gateway node according to one embodiment.

FIG. 2 is a simplified block diagram illustrating selected components of a gateway node 205 according to one embodiment. Gateway node 205 may be, for example, an ePDG in communication with a core communications network such as the core network 101 shown in FIG. 1 via a P-GW (packet gateway; not shown in FIG. 2), and for convenience this configuration will be presumed in describing the embodiment of FIG. 2. In this embodiment, gateway node 205 includes a core network interface 225 for communicating with the core network. A second network interface 230 is also present for communicating with an access network such as the WLAN including access point 110 shown in FIG. 1. Note that while two network interfaces are shown in FIG. 2, in other embodiments a single interface may be configured to support communications with both and perhaps other networks. Additional network interfaces may also be present although they are not shown in FIG. 2.

In the embodiment of FIG. 2, gateway node 200 includes a processor 205 and a memory device 210. Processor 205 may be implemented in hardware or in software executing on a hardware device. Memory device 210 in this embodiment is a typically a physical storage device that may in some cases operate according to stored program instructions. In any case, memory 210 is non-transitory in the sense of not being merely a propagating signal, unless explicitly recited otherwise in a particular embodiment. Memory 210 may be used for storing, among other things, data as well as program instructions for execution by processor 205.

In general, when a UE attempts to access a core network via an untrusted access network, it will send a request message though the access network. When the request reaches a gateway node, for example an ePDG such as gateway node 205 shown in FIG. 2, an authentication protocol and perhaps other protocols are executed and a determination is made as to whether to grant access to the UE. A response message is then sent reporting to the UE the results of this determination. If the result was positive, further communications will usually occur so that access is effectuated. If, on the other hand, the UE is notified that access has been denied, there may be no further communication. The UE, however, either automatically or based on some user action, may make an additional access attempt. In some cases the access network may also re-attempt UE access.

While in some instances a subsequent access attempt may be successful, the reason for access being denied may still exist and the subsequent attempt will also fail. In some cases numerous re-attempts may be made in a relatively short period of time before the UE is either granted access or abandons the attempt. As mentioned above, however, these repeated and often unsuccessful re-attempts increase network traffic and tax network resources. Managing UE access, and specifically repeated UE access attempts, is therefore very desirable.

In accord with the embodiment of FIG. 2, gateway node 200 includes a backoff timer message generator 220. When a UE's access attempt, as alluded to above, gateway node 205 either executes an authentication protocol or requests that another node, such as a separate AAA server, do so. In either case, when node 200 determines whether authentication will occur, a backoff timer message generator generates any necessary backoff timer messages. A backoff timer message contains at least any indication of a backoff timer value, but may contain other information as well. Prior to generating the backoff message then, the backoff timer generator must also determine the backoff timer value.

In most implementations, a backoff timer message will be generated when the US is denied authorization, even if the backoff timer value is to be zero. In some implementations, a backoff timer message will be generated even when the UE has been authorized. In such cases, the backoff timer value in the backoff timer message may indicate to the UE that the backoff timer in the UE, if any, should be set to zero. In some cases, the backoff timer message is appended or pre-pended to, or inserted into, another message. Otherwise, the gateway node also effects transmission of the backoff timer message to the user. In some cases, a backoff timer value may indicate to the UE that a backoff timer should be deactivated. In that case, the UE will not attempt access in this way again, at least until, in some cases, the UE is powered off and on, or the UICC containing a USIM is removed and replaced.

Note that FIG. 2 illustrates selected components according to this embodiment and some variations are described above. Other variations are possible without departing from the claims of the invention as there recited. In some of these embodiments, for example, illustrated components may be integrated with each other or divided into subcomponents. There will often be additional components in the network node and in some cases fewer. The illustrations components may also perform other functions in addition to those described above, and some of the functions may alternately be performed elsewhere than described in these examples.

FIG. 3 illustrates a backoff timer notify payload 300 according to one embodiment. As should be apparent, the backoff timer notify payload will typically be inserted into another message. In the embodiment of FIG. 3, the notify payload 300 includes a message type field 315 for indicating that the message, or this portion of it, includes a backoff timer notification. In this embodiment, the message type field 315 is allocated 2 octets, the $3^{rd}$ and the $4^{th}$ of the notify payload, although in other implementations the length of this field may vary.

In the embodiment of FIG. 3, a backoff timer value field 325 is also included. The value in this field indicates the amount of time the UE should delay before making another access attempt. It may also indicate either that no further attempts should be made or that the backoff function may be bypassed entirely and a re-attempt may be made immediately. In some implementations the value in the backoff timer field may also indicate that any subsequent access attempt should or shall occur only after the occurrence of another event, for example the receipt by the UE of a certain broadcast message. In this embodiment the length of the backoff timer field 325 is one octet, here the $6^{th}$, but again the length or position may vary. The length of the backoff timer field 325 is indicated in length field 320, which itself is in this embodiment allocated one octet, here the $5^{th}$.

In the embodiment of FIG. 3, a protocol ID field occupies a first octet and will contain a protocol ID related to the communication session with the UE. The $2^{nd}$ octet 310 is open or reserved for future use or for other information in particular applications. Note that the notify payload 300 is only one embodiment and other configurations are possible in specific implementations. Note also that the length and range of values for each field may also be implementation-specific.

UE access via an untrusted network may handled using an IKEv2 protocol (according to, inter alia, IETF RFC 7296). FIG. 4 is a message flow diagram 400 illustrating a method for managing access according to one embodiment. In this embodiment, UE 405 and ePDG 410 are shown. As should be apparent from FIG. 1, there may be intermediate devices, for example access point 110, but these are for convenience omitted from FIG. 4. Also not shown is any necessary preliminary messaging between such intermediate devices and either UE 405 or ePDG 410, which are presumed to have been successfully completed in some a manner as to allow the illustrated communications between UE 405 and ePDG 410.

In the embodiment of FIG. 4, UE 405 and ePDG 410 begin with an IKE_SA_INIT exchange 415 to, for example, negotiate security associations and send nonces and Diffie-Hellman values. Once this has been completed, the UE sends an IKE_AUTH Request message 420. The Request message 420 is essentially a request for network access and may include, inter alia, a user ID, a configuration payload, and security associations. Upon receiving message 420 the ePDG 410 will determine whether the UE 405 is to be authorized for access to the core network, for example by communicating with an AAA server (not shown). This determination may be conveyed back to the UE in an IKE_AUTH Response message 425 along with, inter alia, an ePDG ID and certificate.

In the embodiment of FIG. 4, in the event that authorization of the UE is denied the IKE_AUTH Response message 425 will also include a backoff timer notify payload, for example as shown in FIG. 3. A backoff timer value is determined and inserted into the payload before the Response message 425 is transmitted. In some embodiments, a Backoff_Timer Notify payload is also included in the IKE_AUTH Response message 425 if the UE is to be authorized. In that case, the backoff timer value, for example 111, will usually indicate that the backoff timer of the UE 405, if any, should be set to zero.

Here it should be noted that in this embodiment, the behavior of the ePDG is unaffected by whether the UE 405 actually has an operational backoff timer. In other embodiments, the ePDG 410 may first determine whether this is true, for example by a separate query to the UE 405.

In the embodiment of FIG. 4, the backoff timer value may be determined by reference to a standard or default, value or may vary depending on one or more of a number of factors. The value may vary, for example, based on actual or anticipated traffic considerations or on the reason authorization was denied to this particular UE. The number of times this particular UE has been recently denied access may also be considered, as may a history of backoff time values for this UE. In some cases a backoff time value may be assigned even when a UE will be authorized to access the core network but should for some reason delay, although this is not expected to be usual.

In some embodiments where a backoff timer notify payload is employed, the Protocol ID field (see FIG. 3) will be populated according to the protocol IETF RFC 5996 and the SPI size field is set to zero. The bits of the Backoff Timer Value field maybe divided so that some of the bits (for example, three bits) are used to specify a unit, with the actual value reflected in the (or some of the) remaining bits.

In the embodiment of FIG. 4, when the UE receives an IKE_AUTH Response message including a backoff timer value, in a Backoff_Timer Notify payload or otherwise, that is not zero and does not indicate timer deactivation, it sets a backoff timer to the backoff timer value indicated in the IKE_AUTH Response message and does not attempt access again until the backoff timer has expired. If the backoff timer value is zero, the UE re-attempts access at any time, subject to any internal indications not to or to delay. In some embodiments, powering the UE off and on or removing and replacing a UICC containing the USIM clears any backoff setting previously established and in most cases an attempt at access may then be made or re-attempted at any time.

A variation of this scheme may be used for access via trusted networks. FIG. 5 is a message flow diagram 500 illustrating a method for managing access according to one embodiment. In FIG. 5 selected messages between UE 505 and gateway node 510 are shown. Note that in the case of a trusted network there may be no single node that performs a function analogous to the ePDG described above, and the gateway node functions may in fact be allocated to physically or logically distinct nodes of the trusted network. In some embodiments the gateway node 510 is a 3GPP AAA server or a TWAG (trusted wireless access gateway).

In the embodiment of FIG. 5, UE 505 initiates contact with the trusted network and a connection is established 515. An EAP-AKA' protocol according to, for example, IETF RFCs 4187 and 5448 may be invoked. The gateway node 510 in this embodiment then transmits an EAP-Request/Identity message 520 to the UE 505, and the UE 505 transmits an EAP-Response/Identity message 525. The next exchange includes the gateway 510 sending an EAP-Request/AKA'_Challenge message 530 and receiving a response in the form of an EAP-Response/AKA'_Challenge message 535. The gateway 510 then determines whether the UE 505 will be authenticated, if not, and sends an EAP-Request/AKA_Notification message 540 including, inter alia, a backoff time value. In a preferred embodiment, the EAP-Response/AKA'_Challenge message 535 includes an SCM_REQUEST and the EAP-Request/AKA'_Notification message 540 includes an SCM_RESPONSE including the backoff timer value. Note that the backoff timer value payload may also in some embodiments be sent with an appropriate value to indicate to the UE that the authentication was successful.

In the embodiment of FIG. 5, when the UE receives an EAP-Request/AKA'_Notification message including a backoff timer value that is not zero and does not indicate timer deactivation, it sets a backoff timer to the backoff timer value indicated in the EAP-Request/AKA'_Notification message and does not attempt access again until the backoff timer has expired. If the backoff timer value is zero, the UE re-attempts access at any time, subject to any internal indications not to or to delay. In some embodiments, powering the UE off and on or removing and replacing a UICC containing the USIM clears any backoff setting previously established and in most cases an attempt at access may then be made or re-attempted at any time.

Figure 6:
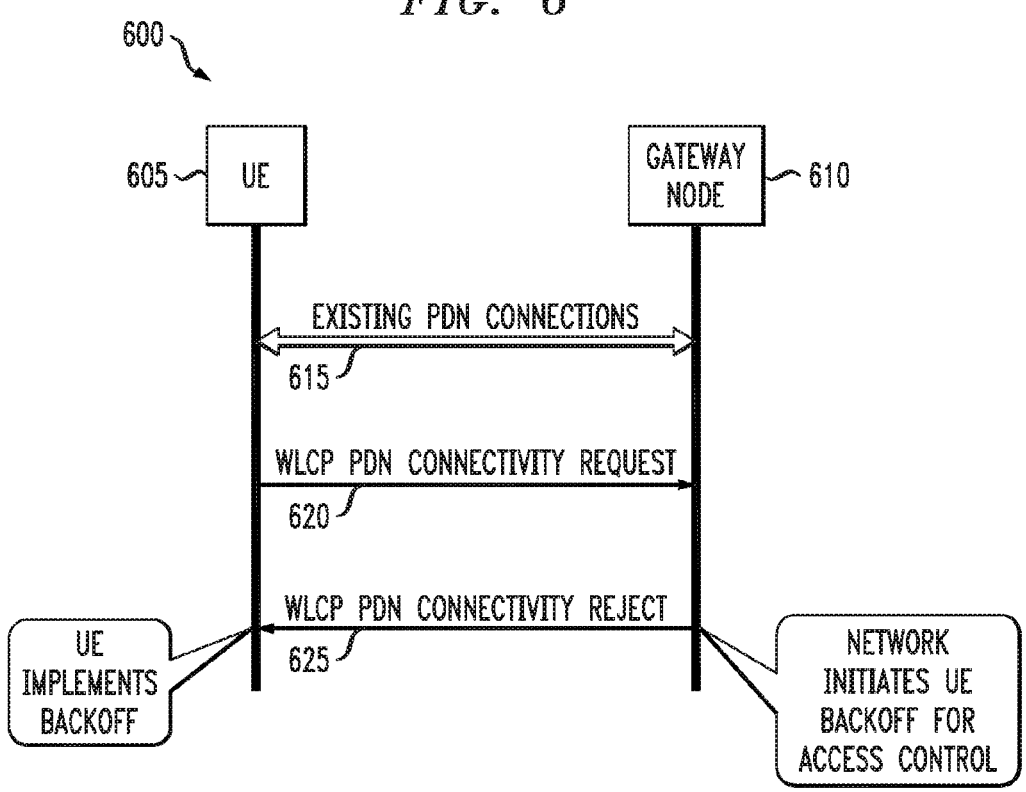
FIG. 6 is a message flow diagram illustrating a method for managing access according to one embodiment.

A variation of this scheme may be used for access via trusted networks where PDN connections 615 already exist between the UE 605 and a trusted-network node 610. FIG. 6 is a message flow diagram 600 illustrating a method for managing access according to one embodiment. In FIG. 6 selected messages between UE 605 and gateway node 610 are shown. Note that in the case of a trusted network there may be no single node that performs a function analogous to the ePDG described above, and the gateway node functions may in fact be allocated to physically or logically distinct nodes of the trusted network. In some embodiments the gateway node 610 is a 3GPP AAA server or a TWAG.

Presuming existing PDN connections 615, in the embodiment of FIG. 6 to request access to the core network the UE 605 sends a WLCP PDN Connectivity Request 620 that may include, inter alia, an APN and a PDN type. In this embodiment, if the requested service is not authorized, the gateway node 510 sends a WLCP PDN Connectivity Reject Message 625. In an exemplary embodiment, the content of the WLCP PDN Connectivity Reject Message 625 may include information elements such as a PDN connectivity reject message identity, a transaction identity, an indicator of the cause of the rejection, and a backoff timer value.

In the embodiment of FIG. 6, when the UE receives an WLCP PDN Connectivity Reject message including a backoff timer value, that is not zero and does not indicate timer deactivation, it sets a backoff timer to the backoff timer value indicated in the WLCP PDN Connectivity Reject message 625 and does not attempt access again until the backoff timer has expired. If the backoff timer value is zero, the UE re-attempts access at any time, subject to any internal indications not to or to delay. In some embodiments, powering the UE off and on or removing and replacing a UICC containing the USIM clears any backoff setting previously established and in most cases an attempt at access may then be made or re-attempted at any time.

Note that the sequence of message flows illustrated in FIGS. 4-6 represent respective exemplary embodiments; in each case some variation is possible without deviating from the invention as recited in the claims. For example, additional messaging may be added to that shown in FIGS. 4-6, and in some implementations one or more of the illustrated messages may be omitted. In addition, the messages of the method may be transmitted and received in any logically-consistent order unless a definite sequence is recited in a particular embodiment.

In this manner, access reattempts are managed, or at least are attempted to be managed with at least the objective of making more efficient use of network resources.

In some embodiments, certain aspects of the techniques described above may be implemented by one or more processors of a processing system executing software. The software comprises one or more sets of executable instructions stored or otherwise tangibly embodied on a non-transitory computer readable storage medium unless explicitly claimed otherwise. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method of managing access in a wireless communication network, comprising:
   receiving in a network gateway a request for UE (user equipment) access to a core network wherein the gateway is an ePDG (evolved packet data gateway);
   determining whether UE access is authorized;
   determining a backoff timer value if the UE access is not authorized; and
   generating a response message comprising the determined backoff value, if any.

2. The method according to claim 1, further comprising sending the response message toward the UE.

3. The method according to claim 1, further comprising determining a backoff timer value if the UE access is authorized.

4. The method according to claim 1, wherein determining whether UE access is authorized comprises sending a query to an authentication server and receiving a response from the authentication server.

5. The method according to claim 1, wherein the core network is an EPC (evolved packet core).

6. The method according to claim 1, wherein the request for UE access is an IKE_AUTH (internet key exchange authentication) Request message and the response is an IKE_AUTH Response.

7. The method according to claim 6, wherein the backoff timer value, if any, is contained in a field of a Backoff_Timer Notify payload of the response message.

8. The method according to claim 7, wherein the Backoff_Timer Notify payload further comprises a Protocol ID field and a Notify Message Type field.

9. The method according to claim 1, wherein backoff timer value determination, if any, takes into account a reason for UE authorization failure.

10. The method according to claim 1, wherein backoff timer value determination, if any, takes into account a number of attempts that the UE has made to gain access.

11. An ePDG, comprising:
    a network interface;
    a processor;
    a backoff timer message generator; and
    a non-transitory memory device comprising program instructions that when executed by the processor and the backoff timer message generator cause the gateway apparatus to:
    receive a request for UE access to a core network;
       determine whether UE access is authorized;
       determine a backoff timer value if the UE access is not authorized; and
       generate a response message comprising the determined backoff value, if any.

12. The gateway apparatus of claim 11, wherein the memory device further comprises program instructions that executed cause the gateway apparatus to send the response message toward the UE.

13. The gateway apparatus of claim 11, wherein the memory device further comprises program instructions that executed cause the gateway apparatus to send a query to an authentication server and to receive a response from the authentication server.

14. The gateway apparatus of claim 11, wherein the gateway apparatus is a TWAG.

15. The gateway apparatus according to claim 11, wherein the request for UE access is an IKE_AUTH Request message and the response is an IKE_AUTH Response.

16. The gateway apparatus according to claim 11, wherein the request for UE access is an EAP-Response/AKA' (extensible authentication protocol-Response/authentication and key agreement') Challenge message and the response is an EAP-Request/AKA' Notification.

17. The gateway apparatus according to claim 16, wherein the EAP-Response/AKA' Challenge message comprises an SCM_Request (single-connection mode Request) and the EAP-Request/AKA' Notification includes an SMC_Response.

18. The gateway apparatus according to claim 17, wherein the SCM_Response comprises the backoff timer value.

* * * * *